United States Patent [19]
Takamatsu

[11] 3,889,341
[45] June 17, 1975

[54] APPARATUS FOR APPLYING SLIDERS TO A SLIDE FASTENER CHAIN

[75] Inventor: Ikuo Takamatsu, Uozu, Japan

[73] Assignee: Yoshida Kogyo Kabushiki Kaisha, Tokyo, Japan

[22] Filed: Oct. 9, 1974

[21] Appl. No.: 513,321

Related U.S. Application Data
[62] Division of Ser. No. 426,927, Dec. 20, 1973.

[30] Foreign Application Priority Data
Dec. 27, 1972 Japan.................................. 47-1526

[52] U.S. Cl.......................................... 29/207.5 SL
[51] Int. Cl........................................... B23p 19/04
[58] Field of Search............ 29/207.5 SL, 207.5 ST, 29/207.5 R, 408, 409, 207.5 D

[56] References Cited
UNITED STATES PATENTS
3,812,571   5/1974   Dori............................ 29/207.5 SL

*Primary Examiner*—Thomas H. Eager
*Attorney, Agent, or Firm*—Hill, Gross, Simpson, Van Santen, Steadman, Chiara & Simpson

[57] ABSTRACT

An apparatus for assembling sliders to a slide fastener chain includes a guide block having a first or horizontal guide surface and a second guide surface extending downwardly from a merging point at which both guide surfaces merge and means provided at said merging point for deflecting the fastener chain to split open slits therein.

2 Claims, 8 Drawing Figures

APPARATUS FOR APPLYING SLIDERS TO A SLIDE FASTENER CHAIN

BACKGROUND OF THE INVENTION

PRIOR APPLICATIONS

This application is a division of application Ser. No. 426,927, filed Dec. 20, 1973.

1. Field of the Invention

The invention relates to an apparatus for applying sliders to a slide fastener chain of substantially endless length.

2. Prior Art

Attempts have been made to automate the assembly of sliders upon a slide fastener chain which had been mostly by hand, a process which is time-consuming and expensive. To accomplish such automatic assembly, it is known to hold sliders stationary and to press them forcibly against a slide fastener chain to deflect the latter locally out of its plane so that the slider can be aligned and inserted through with element-free sections on the fastener chain. With such assembly, there is a disadvantage in that due to the fastener chain's being deflected locally by the slider, its movement during the assembly operation is not smooth, adversely affecting the rate of production.

SUMMARY OF THE INVENTION

According to this invention, there is a guide block having guide surfaces for the fastener chain and a guide groove extending adjacently thereto for receiving sliders, means for splitting open the transverse slits in the fastener chain, separating means movable into and away from the path of the fastener chain for separating the two opposed stringer tapes, and a slider holder arranged to release sliders one at a time onto the fastener chain.

Accordingly, it is an object of the invention to provide an apparatus for assembling sliders upon a slide fastener chain in an automatic cycle of operation, such apparatus being simple in construction and highly reliable in operation.

Many other advantages, features and addtional objects of the present invention will become manifest to those versed in the art upon making reference to the detailed description and the accompanying drawings in which a preferred structural embodiment incorporating the principles of the present invention is shown by way of illustrative example.

ON THE DRAWINGS

Figure 1:
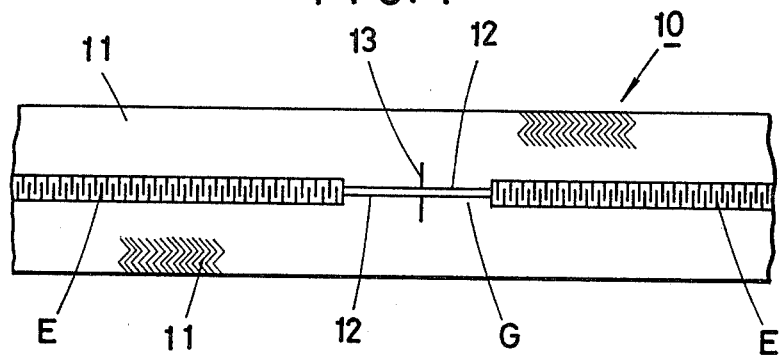
FIG. 1 is a plan view of a slide fastener chain prior to the assembly of sliders thereon.

AS SHOWN ON THE DRAWING:

With reference to FIG. 1, a slide fastener chain 10 comprises a pair of oppositely disposed stringer tapes 11, 11 each carrying along their respective inner longitudinal edges 12 a row of fastener elements E, the stringer tapes 11, 11 being engaged and disengaged by the reciprocal movement of a slider S along the rows of elements E in the usual manner. The fastener elements E may be of a discrete or continuous type of structure to which sliders may be applied by apparatus according to the invention. The principles of the apparatus may be applied not only to an ordinary type of fastener having its elements exposed to external view, but also to a so-called concealed type wherein the fastener elements are disposed so as not to be seen when attached to a garment or the like.

Although it is not always necessary, it is preferred for best results to provide element-free gaps G in the fastener chain at predetermined intervals along which the chain is cut into individual fastener lengths.

There is provided a slit or cut 13 formed in the mid part of each of the element-free gaps G and extending transversely across the opposed element-carrying edges 12 at an angle perpendicular or slightly inclined to the longitudinal axis of the fastener chain.

Figure 2:
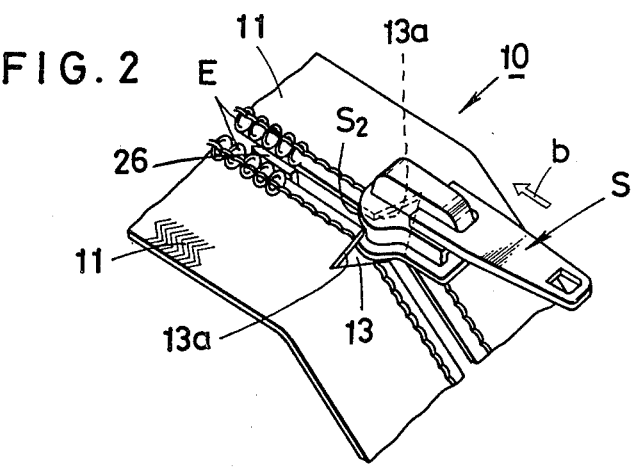
FIG. 2 is a perspective view of the slide fastener chain showing the same in a disposition for receiving a slider.
Figure 3:
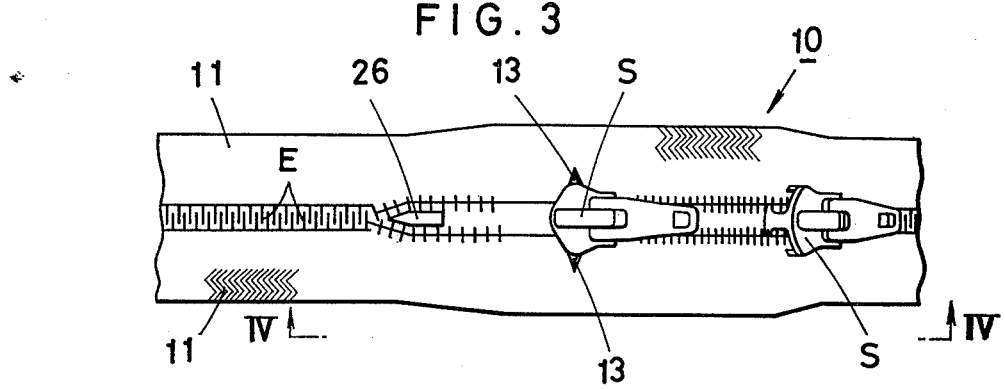
FIG. 3 is a plan view of the fastener chain corresponding to FIG. 2 and showing the slider mounted in succession thereon.
Figure 4:
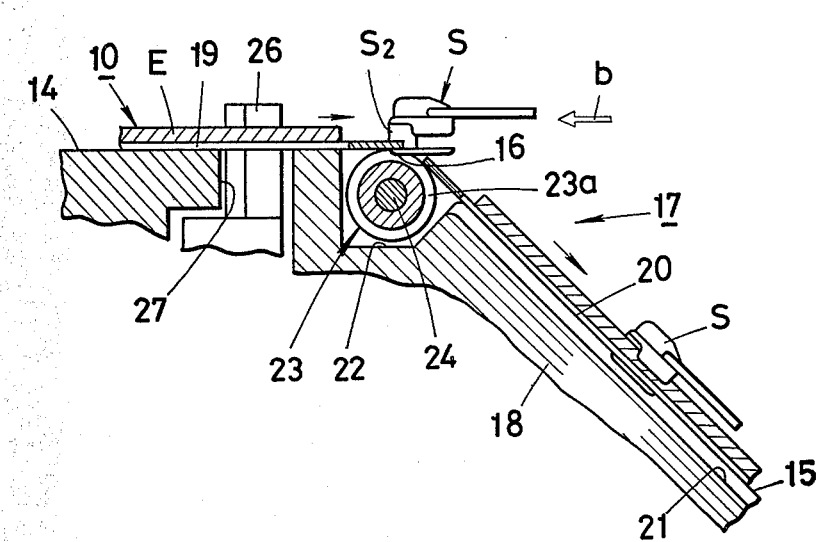
FIG. 4 is a longitudinal cross-sectional view taken along the line IV—IV of FIG. 3.
Figure 5:
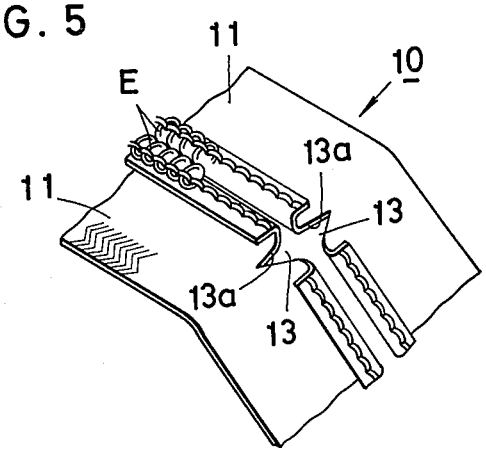
FIG. 5 is a view similar to FIG. 2 but showing a concealed type of fastener to which the principles of the invention can be equally applied.

As shown in FIG. 4, the fastener chain 10 is moved face up in the direction of the one-headed arrow along a first or horizontal path of travel 14 and then along a second path 15 extending at an angle downwardly inclined relative to the first path. The first and second paths merge at a cornering point 16 which defines a slider assembling station. The movement of the fastener chain 10 is intermittent and is arranged to advance the fastener a distance corresponding to the length of the individual fastener which extends between two adjacent gaps G, or more specifically two adjacent slits 13, until the chain 10 is brought to a stop temporarily at a position in which the slit 13 is registered with the slider assembling station. In this position, the fastener chain 10 is deflected downwardly around the cornering point 16 which functions as an axis of deflection, whereupon the transverse slit 13 is slit open with its upper edge 13a extending parallel with the plane of the first path 14 of the fastener chain and aligned with an entrance end $S_2$ of the slider S through which the fastener chain is treaded, as better shown in FIGS. 2 and 4. While the fastener chain 10 is held stationary in this disposition, the slider S is moved beyond the cornering point 16 in the direction of the arrow b opposite to the direction of travel of the fastener chain 10 with its entrance end $S_2$ directed toward the slit 13 which has been slit open and inserted therethrough to be mounted on the element-carrying edges 12 of the stringer tapes 11, 11. Upon completion of the mounting of the slider S, the fastener chain 10 is moved to continue its intermittent travel until the section of the fastener chain at which the slider S has been mounted moves past the cornering point 16 and down along the second path 15. The fastener chain 10 is then stopped upon arrival at the assembling station of the slit 13 in the next section of the chain, thus to repeat the cycle of operation described. In order to facilitate the threading of the slider S through the fastener chain 10, it is desirable to separate beforehand the two opposed stringer tapes 11, 11, by disengaging the rows of fastener elements E that have previously been coupled together, at a location immediately adjacent to the slit 13 in a manner better illustrated in FIGS. 3 and 4.

Figure 6:
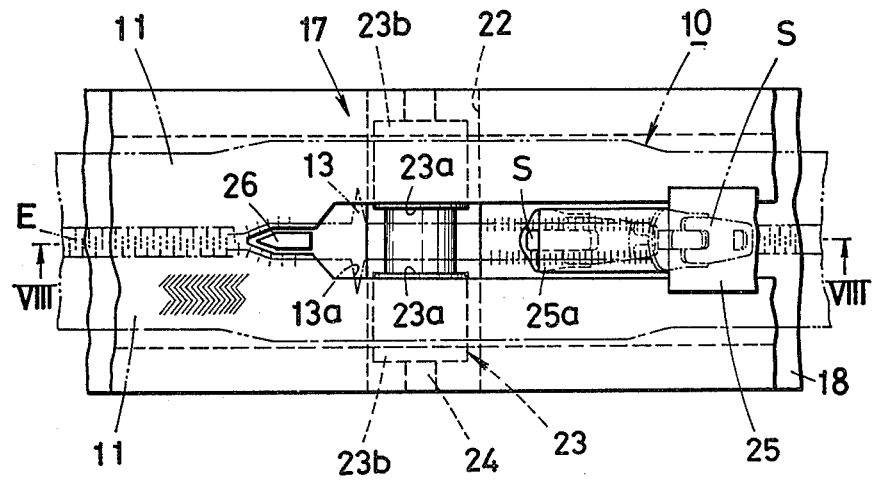
FIG. 6 is a plan view schematically illustrating an apparatus provided in accordance with the invention, and showing the disposition of the fastener chain relative to the same.
Figure 8:
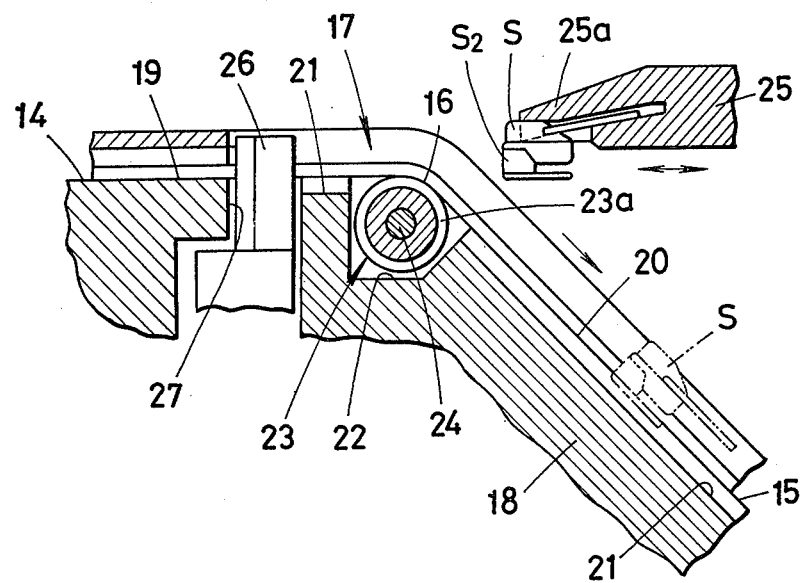
FIG. 8 is a longitudinal cross-sectional view taken along the line VIII—VIII of FIG. 6.

With reference to FIGS. 6 and 8, there is diagrammatically shown a preferred form of apparatus which is adapted to carry the abovedescribed method into practice according to the invention. The slider assembling apparatus, generally indicated at 17, comprises a guide block 18 having a first guide surface 19 and a second guide surface 20 providing the aforementioned first and second paths 14 and 15, respectively for travel of the fastener chain 10 therealong. The guide surfaces 19 and 20 are each provided therein with a centrally extending longitudinal guide groove 21 which is dimensioned to fit the portion of the slider S that underlies the lower surface of the fastener chain 10 when the slider is mounted and which thus is adapted to permit the assembled sliders to run in sliding relation to the groove 21.

The guide block 18 is provided with a recess 22 extending transversely across the passage of the fastener chain 10 and adapted to accommodate a guide roller 23. This roller is rotatably mounted on a pin 24 secured to the block 18 and is provided centrally with a peripheral recess 23a which is dimensioned to fit the slider S for the same purpose achieved by the guide groove 21. On opposite sides of the peripheral recess 23a are subdivided roll portions 23b of the guide roller 23, which portions are disposed in guiding relation to the respective tapes 11, 11 of the fastener chain 10.

The guide roller 23 generally defines the assembling station at a point at which the lines of extension of the first and second guide surfaces 19 and 20 merge to form the cornering point 16 where the slider S is assembled on the fastener chain 10. More specifically, the first guide surface 19 extends horizontally in tangential relation to the periphery of each of the roll portions or subdivisions 23b of the guide roller 23, while the second guide surface 20 extends at an angle downwardly inclined relative to the first guide surface 19 and also in tangential relation to the periphery of each subdivision 23b, so that the fastener chain 10 is deflected around the guide roller 23 as it moves past the same, when the slit 13 is slit open.

Figure 7:
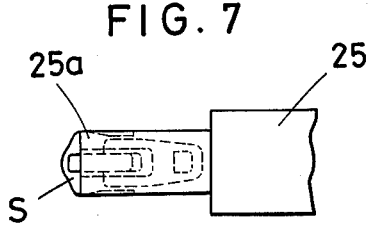
FIG. 7 is a plan view of a slider holder which constitutes part of the apparatus according to the invention.

As shown in FIG. 7, a slider holder 25 has a clamping jaw 25a adapted to releasably hold sliders S one at a time and is connected to a suitable actuating means (not shown) for moving the holder 25 towards and away from the slider assembling station as indicated by the two-headed arrow in FIG. 8. The slider holder 25 is arranged to advance toward the assembling station along a horizontal path parallel to the first guide surface 19 and assume a position in which the entrance end $S_2$ of the slider S retained therein is directed toward and flush with the upper edge 13a of the slit 13 that has been split open. In this position, the holder 25 advances slightly beyond the cornering point 16, threading the slider S through the open slit 13 and thus assembling the same on the fastener chain 10. As this is done, the slider holder 25 is retracted away from the assembling station, whereupon the slider S is released from the clamping jaw 25a and carried away with the fastener chain 10 as the latter begins to move past the guide roller 23 down the second guide surface 20 in the direction of the one-headed arrow.

A fastener chain separator 26 is supported in the guide block 18 for vertical movement into and away from the passage of the fastener chain 10 through opening 27 extending through the guide groove 21 in the first guide surface 19 adjacent the assembling station or the guide roller 23. The separator 26 is adapted to separate the two opposed stringers 11, 11 as the fastener chain 10 moves past it, so as to present the latter as separated to the assembling station, thereby facilitating the slider threading operation.

Although various minor modifications may be suggested by those versed in the art, it should be understood that I wish to embody within the scope of the patent warranted hereon all such embodiments as reasonably and properly come within the scope of my contribution to the art.

I claim as my invention:

1. An apparatus for applying sliders to a slide fastener chain having a pair of opposed stringer tapes carrying rows of fastener elements along their respective inner longitudinal edges and provided with transverse slits formed across said longitudinal edges at spaced locations along the fastener chain, which apparatus comprises:
   a. a guide block having a first or horizontal guide surface and a second guide surface extending at an angle downwardly inclined relative to said first guide surface, along with surfaces the fastener chain is transported intermittently and a guide groove extending longitudinally along said first and second guide surfaces for receiving sliders slidably therein;
   b. means for splitting open the transverse slits in the fastener chain so that the upper edge of each of said slits is aligned with an entrance end of a slider, said means being located at a point interconnecting the lines of extension of said first and second guide surfaces;
   c. separating means vertically movable into and away from the path of the fastener chain along said first guide surface adjacent said splitting means for separating the two opposed stringer tapes prior to arrival of the fastener chain at said splitting means; and
   d. a slider holder movable towards and away from said splitting means and adapted to release sliders one at a time onto the fastener chain at a point slightly beyond said splitting means by threading the slider through said transverse slit.

2. The apparatus as claimed in claim 1 wherein said splitting means comprises a guide roller pivotally supported in said block and provided at a location where said first and second guide surfaces merge, the periphery of said roller being disposed in tangential relation to the lines of extension of said first and second guide surfaces, and said roller having a peripheral recess formed centrally thereof for the passage of a slider.

* * * * *